United States Patent
Paul et al.

(10) Patent No.: US 7,197,280 B2
(45) Date of Patent: Mar. 27, 2007

(54) METHOD AND ARRANGEMENT FOR FAST FREQUENCY SEARCHING IN BROADBAND MOBILE RADIO RECEIVERS

(75) Inventors: Steffen Paul, Baierbrunn (DE); Thomas Ruprich, München (DE)

(73) Assignee: Infineon Technologies AG, Munich (DE)

( * ) Notice: Subject to any disclaimer, the term of this patent is extended or adjusted under 35 U.S.C. 154(b) by 419 days.

(21) Appl. No.: 10/888,771

(22) Filed: Jul. 9, 2004

(65) Prior Publication Data

US 2005/0009471 A1    Jan. 13, 2005

(30) Foreign Application Priority Data

Jul. 10, 2003    (DE) ................................ 103 31 294

(51) Int. Cl.
*H04B 15/00* (2006.01)
*H04B 17/00* (2006.01)

(52) U.S. Cl. .................. 455/62; 455/59; 455/60; 455/63.1; 375/326; 375/343

(58) Field of Classification Search .................. 455/62, 455/59, 60, 63.1, 63.3, 104, 112, 113; 375/326, 375/343

See application file for complete search history.

(56) References Cited

U.S. PATENT DOCUMENTS

| | | | | |
|---|---|---|---|---|
| 5,828,710 A * | 10/1998 | Beale | .......................... | 375/344 |
| 5,862,453 A * | 1/1999 | Love et al. | .................... | 455/69 |
| 6,389,040 B1* | 5/2002 | Viswanathan | ................ | 370/480 |
| 2001/0028692 A1* | 10/2001 | Wiese et al. | ................. | 375/346 |
| 2002/0111142 A1* | 8/2002 | Klimovitch | .................... | 455/63 |

FOREIGN PATENT DOCUMENTS

| | | |
|---|---|---|
| DE | 100 46 575 A1 | 4/2002 |
| EP | 0 693 247 B1 | 4/2004 |
| WO | WO 00/44117 | 7/2000 |

* cited by examiner

*Primary Examiner*—Matthew D. Anderson
*Assistant Examiner*—Tuan Pham
(74) *Attorney, Agent, or Firm*—Baker Botts L.L.P.

(57) ABSTRACT

In the method according to the invention for searching for the carrier frequency f of a mobile radio transmitter in a mobile radio receiver, two or more values $e(k)$ of the spectral input power are measured at different discrete test frequencies $f_k$, where $f_k<f_{k+1}$. The maximum $e(k_{max})$ of the values $e(k)$ and of the associated test frequency $f_{kmax}$ is then searched for. An estimated value f', which is characteristic of the sought carrier frequency f, can be determined from knowledge of the values of at least one value pair $e(k_1)$ and $e(k_2)$ where $k_1<k_{max}<k_2$, and of the specific test frequency $f_{kmax}$.

20 Claims, 4 Drawing Sheets

| $E_c/I_0$ [dB]: | -7 | -2 | 3 | 8 | 13 |
|---|---|---|---|---|---|
| Mean frequency error [MHz]: | 0.50 | 0.35 | 0.25 | 0.10 | 0.05 |
| Max. frequency error [MHz]: | 2.40 | 0.60 | 0.50 | 0.40 | 0.30 |
| Min. frequency error [MHz]: | 0.30 | 0.20 | 0.10 | 0.00 | 0.00 |

FIG 5

METHOD AND ARRANGEMENT FOR FAST FREQUENCY SEARCHING IN BROADBAND MOBILE RADIO RECEIVERS

PRIORITY

This application claims priority to German application no. 103 31 294.3 filed Jul. 10, 2003.

TECHCICAL FIELD OF THE INVEVTION

The present invention generally relates to a method and a circuit arrangement for determination of the carrier frequency of a mobile radio transmitter in a mobile radio receiver.

DESCRIPTION OF RELATED ART AND BACKGROUND OF THE INVENTION

When signals are transmitted in mobile radio systems, the data signal to be transmitted is modulated onto a radio-frequency carrier signal, with the two signals being mixed with one another. After the modulation process, the combined signal is transmitted via the transmitting antenna. During the subsequent demodulation process at the receiving end, the carrier signal must be removed once again from the received signal by mixing with an LO (Local Oscillator) signal which is associated with the carrier signal, thus resulting in the so-called base band signal. The precise frequency of the carrier signal, also referred to as the carrier frequency, is generally not known in the receiver in its initial state and must first of all be determined or estimated by suitable methods. In this case, a broad frequency range is generally predetermined, in which the radio channel to be detected and which is governed by the carrier frequency is located. The object of the frequency synchronization process in the receiver is now to estimate as accurately as possible the mid-frequency of the transmission channel, which corresponds to the carrier frequency.

The following criteria can be used as a quality measure for the estimation method during the estimation process:

a) the accuracy of the estimation and b) the time required for an estimation process.

In this case, excessively large estimation errors generally have a significant adverse effect on the performance of the receiver; excessively long estimation times are generally the result of an unacceptable, very complex implementation, and delay the setting up of the connection.

In the methods which are known from the prior art for frequency searching, a multiple stage approach is chosen in order to achieve a predetermined accuracy. First of all, the carrier frequency of the transmitter is determined to a specific accuracy by trying out all of the possible carrier frequencies $f_k$, where k=1 ... N. To do this, a so-called RSSI (Radio Signal Strength Indicator) measurement is carried out in order to pass through the permissible frequency range with a step width Δ and the received signal power is measured over a broad bandwidth, that is to say with a reception filter having a broad bandwidth. That frequency $f_{kmax}$ at which the most power is received is in this case the closest to the actual carrier frequency, and thus represents a first estimate of the carrier frequency. The frequency uncertainty of the first estimate results from the magnitude of the frequency step width Δ. A more accurate, second estimated value of the carrier frequency is determined in a second step, by now measuring the spectral received power using a narrowband reception filter in discrete steps in a narrow frequency band around the frequency that was found in the first estimation process. The disadvantage of this method is that a wide frequency bandwidth (for example of 60 MHz) must be searched through with a frequency step width which is relatively narrow in comparison to this bandwidth (for example 1 MHz) in the first method step, and this involves a long search time. However, the frequency uncertainty range which is relatively large in comparison to the required resolution nevertheless then remains, which must then be investigated again in the second method step, with a narrowband search. Once again, this step is very time-consuming.

SUMMARY OF THE INVENTION

The invention is based on the object of specifying a method for determination of the carrier frequency of a mobile radio transmitter in a mobile radio receiver, which provides high precision in the estimation of the carrier frequency while at the same time requiring little computation, time and implementation complexity. A further aim of the invention is to provide a corresponding arrangement having the above characteristics.

The object on which the invention is based can be achieved by a method for searching for the carrier frequency f of a mobile radio transmitter in a mobile radio receiver, having the following steps:

a) measuring two or more values e(k) of a variable which is characteristic of the spectral reception power at various discrete test frequencies $f_k$, with the test frequencies $f_k$ differing by multiples of a step width frequency Δ and with $f_k$ being less than $f_{k+1}$ for all measured values e(k) and e(k+1);

b) searching for the maximum $e(k_{max})$ of the values e(k), with $e(k_{max})$ being associated with a specific test frequency $f_{kmax}$; and c) determining of an estimated value f', which is characteristic of the sought carrier frequency f, from knowledge of the values of at least one value pair $e(k_1)$ and $e(k_2)$ where $k_1 < k_{max} < k_2$, and of the specific test frequency $f_{kmax}$.

The determination of the estimated value f' in step c) may include the step of determining an error variable S from knowledge of the values of the at least one value pair $e(k_1)$ and $e(k_2)$, where S represents a measure of the discrepancy between the respective values of the at least one value pair $e(k_1)$ and $e(k_2)$. The variables $k_1$ and $k_2$ can be set to $k_1=k_{max}-1$ and $k_2=k_{max}+1$. The error variable S can be obtained using the following equation:

$$S = \frac{e(k_{max}+1)}{e(k_{max}-1)} - \frac{e(k_{max}-1)}{e(k_{max}+1)}.$$

The method for determination of the estimated value f' of the carrier frequency in step c) may use an analytical equation, which the error variable S links either to the two variables of the estimated value f' of the carrier frequency and the test frequency $f_{kmax}$, or to the frequency mistuning $f_v$, formed as the difference between f' and $f_{kmax}$. The analytical equation may include the following variables:

one or more variables for characterization of the form of the transmission spectrum and/or of the received spectrum, in particular the bandwidth of the transmission and/or received spectrum and/or the bandwidth of the transmission and/or reception filter. The estimated value f' of the carrier frequency in step c) can be obtained as follows:

$$f' = f_{k\max} + \frac{B-\Delta}{S}(\sqrt{4+S^2} - 2),$$

where B indicates the bandwidth of the transmission and received spectrum. During the determination of the estimated value f' of the carrier frequency in step c), either the measured values e(k) can be corrected directly by the broadband white noise floor of the received spectrum or, correction terms which correspond to the broadband white noise floor can be used in the calculation in step c). A radio signal strength indicator (RSSI) measurement can be carried out in step a). An additional step d) can be carried out after step c) which comprises a correlative frequency fine tuning process on the basis of a comparison of a synchronization sequence, which is contained in the received signal, and the synchronization sequence which is known in the receiver, taking into account the estimated value f' of the carrier frequency as determined in step c). Step d) can be carried out as follows:

producing differently frequency-shifted signals $s_i$ based on the received signal, which are shifted with respect to the received signal by the estimated value f' of the carrier frequency and multiples of a step width frequency $\Delta'$, where $\Delta' < \Delta$;

determining two or more values of a variable c(i) which is characteristic of the correlation between the synchronization sequence which is contained in the respective signal $s_i$ and the synchronization sequence which is known in the receiver; and determining a new estimated value f'', which is characteristic of the carrier frequency f, by evaluation of the values c(i).

The object can also be achieved by a circuit arrangement for searching for the carrier frequency f of a mobile radio transmitter in a mobile radio receiver, comprising a measurement device for measurement of two or more values e(k) of a variable which is characteristic of the spectral transmission power at different discrete test frequencies fk, with the test frequencies differing by multiples of a step width frequency $\Delta$, an evaluation device which determines the maximum $e(k_{max})$ of the values e(k), where $e(k_{max})$ is associated with a specific test frequency $f_{kmax}$, and a computation means which determines the estimated value f' of the carrier frequency f from knowledge of the values of the at least one value pair $e(k_1)$ and $e(k_2)$ and of the test frequency $f_{kmax}$, where $k_1 < k_{max} < k_2$.

The object can further be achieved by a circuit arrangement for searching for the carrier frequency f of a mobile radio transmitter in a mobile radio receiver, comprising a measurement device for measurement of two or more values e(k) of a variable which is characteristic of the spectral transmission power at different discrete test frequencies $f_k$, with the test frequencies differing by multiples of a step width frequency $\Delta$, an evaluator which determines the maximum $e(k_{max})$ of the values e(k), where $e(k_{max})$ is associated with a specific test frequency $f_{max}$, and a processor which determines the estimated value f' of the carrier frequency f from knowledge of the values of the at least one value pair $e(k_1)$ and $e(k_2)$ and of the test frequency $f_{kmax}$, where $k_1 < k_{max} < k_2$.

The variables $k_1$ and $k_2$ can be set to $k_1 = k_{max} - 1$ and $k_2 = k_{max} + 1$. The circuit arrangement may further comprise a correlator for comparison of a synchronization sequence which is contained in the received signal and of the synchronization sequence which is known in the receiver, a frequency shifting means for spectral shifting of the received signal, and a second evaluation device or evaluator, which compares the output variable from the correlator at different frequency shifts for frequency fine tuning. The frequency shifting means may produce differently frequency-shifted signals $s_i$ based on the received signal, which are shifted with respect to the received signal by the estimated value f' of the carrier frequency and multiples of a step width frequency $\Delta'$, where $\Delta' < \Delta$; and the correlator may determine two or more values of a variable c(i) which is characteristic of the correlation between the synchronization sequence which is contained in the respective signal $s_i$ and the synchronization sequence which is known in the receiver; and the second evaluation device may determine a new estimated value f'', which is characteristic of the carrier frequency f, by evaluation of the values c(i). The measurement device may carry out an radio signal strength indicator (RSSI) measurement. The circuit arrangement can be used in a UMTS receiver.

In the method according to the invention, the search for the carrier frequency f of a mobile radio transmitter in a mobile radio receiver is subdivided into the following steps: in a first step, two or more values e(k) of a variable which is characteristic of the spectral reception power are determined at different discrete test frequencies $f_k$. These test frequencies $f_k$ differ by multiples of a step width frequency $\Delta$, where $f_k < f_k + 1$ for all measured values e(k) and e(k+1). In a further step, the maximum $e(k_{max})$ of the values e(k) is searched for, where $e(k_{max})$ is associated with a specific test frequency $f_{kmax}$. Finally, an estimated value f' which is characteristic of the sought carrier frequency f is determined from knowledge of the values of at least one value pair $e(k_1)$ and $e(k_2)$ where $k_1 < k_{max} < k_2$, and of the specific test frequency $f_{kmax}$. The values $e(k_1)$ and $e(k_2)$ for determination of f' are accordingly determined at discrete frequencies below and above $f_{kmax}$.

The method according to the invention thus offers the advantage that the specific processing of the measured values makes it possible to estimate the sought frequency with better resolution than the step width frequency $\Delta$. It is thus possible on average to determine the frequency f to about 10% to 20% of the search pattern. Conversely, the method according to the invention allows the step width $\Delta$ to be increased by the processing according to the invention of the measured values for a predetermined accuracy in comparison to a conventional search algorithm, that is to say a coarse search pattern is used, so that it is possible to considerably reduce the time consumed for the estimation process.

According to one preferred embodiment, the value of an error variable S is determined from knowledge of the values of the at least one value pair $e(k_1)$ and $e(k_2)$ in order to determine the estimated value f'. In this case, S represents a measure of the discrepancy between the respective values of the at least one value pair $e(k_1)$ and $e(k_2)$. This offers the advantage that the transmission frequency can be deduced directly from the value of S in conjunction with the specific test frequency $f_{kmax}$.

According to a further preferred embodiment, $k_1 = k_{max} - 1$ and $k_2 = k_{max} + 1$. The two measured values $e(k_{max} + 1)$ and $e(k_{max} - 1)$ at discrete frequencies directly above and directly below $f_{kmax}$ are accordingly used for determination of the characteristic estimated value f'. This offers the advantage that an estimated value which is characteristic of the sought carrier frequency can be produced by the evaluation of measured values in a simple manner at discrete frequencies which are symmetrical with respect to $f_{kmax}$. Furthermore, the signal level of these values is typically still sufficiently high since they are close to the level maximum, so that the method operates robustly even when the noise level is high.

In a further preferred embodiment, the error variable S can be determined using the following equation:

$$S = \frac{e(k_{max}+1)}{e(k_{max}-1)} - \frac{e(k_{max}-1)}{e(k_{max}+1)} \quad (1)$$

In this preferred method variant, S is advantageously independent of the absolute magnitudes of the power measurement, and is governed only by the power ratios.

According to a further preferred embodiment, the estimated value f' of the carrier frequency can be determined by means of an analytical equation which logically links the error variable S either with the two variables of the estimated value f' of the carrier frequency and the test frequency $f_{kmax}$ or with the frequency mistuning $f_v$, formed as the difference between f' and $f_{kmax}$. The estimated value f' can thus easily be determined from knowledge of the variable S which is formed from measured variables.

The analytical equation preferably includes one or more variables for characterization of the form of the transmission spectrum and/or of the received spectrum, in particular the bandwidth of the transmission and/or received spectrum and/or the bandwidth of the transmission and/or reception filter. In particular, according to this advantageous embodiment variant, it is possible to determine the estimated value f' as a function of the bandwidth of the reception and transmission filters, with both variables being known from the system specification.

According to a further advantageous embodiment, the estimated value f' of the carrier frequency can be determined on the basis of a calculation rule as a function of $f_{kmax}$ the value of the error variable S and the bandwidth B of the transmission and received spectrum. If the value of the error variable S has been determined by means of the equation (1), the estimated value f, of the carrier frequency can be determined as follows:

$$f' = f_{kmax} + \frac{B-\Delta}{S}\left(\sqrt{4+S^2}-2\right) \quad (2)$$

A calculation rule such as this can be implemented very easily; only one system-specific parameter—the bandwidth B—is required. In a corresponding manner it is, of course, also possible to calculate the frequency mistuning $f_v$ by means of analogous equations, from which the estimated value f' can then be determined.

The broadband white noise floor in the received spectrum is preferably taken into account when determining the estimated value f'. The measured values e(k) may in this case be corrected directly by the broadband white noise floor of the received spectrum or the determination equation is based on the use of correction terms which correspond to the broadband white noise floor. This measure makes the method robust when the noise levels are high.

In a further step in the method according to the invention, a significantly more narrowband frequency search is preferably carried out, based on the results of the previous steps. This is done by carrying out a correlative frequency fine tuning process on the basis of a comparison of a synchronization sequence, which is contained in the received signal, and the synchronization sequence which is known in the receiver. In order to carry out the correlation process, it is necessary to take account of the previously determined estimated value f', since this fine tuning process is carried out with a smaller step width frequency, so that only a narrow range of the previously searched frequency range is considered. Finally, this further step allows the estimated value to be determined sufficiently precisely, so that the frequency synchronization operates sufficiently accurately for a telecommunications link (for example with an accuracy of 3 ppm—parts per million). A Broadband frequency search with the processing of the measured values according to the invention as a further estimation step and a subsequent narrowband frequency search offer a major advantage in comparison to a conventional search method with a broadband search followed by a narrowband search: for a predetermined step width frequency $\Delta$, the narrowband search according to the invention can be carried out with fewer search steps, since the resolution of the broadband search according to the invention is less than $\Delta$.

BRIEF DESCRIPTION OF THE DRAWINGS

The invention will be explained in more detail in the following text using an exemplary embodiment and with reference to the drawings, in which.

DETAILED DESCRIPTION OF PREFERRED EMBODIMENTS

Figure 1A:
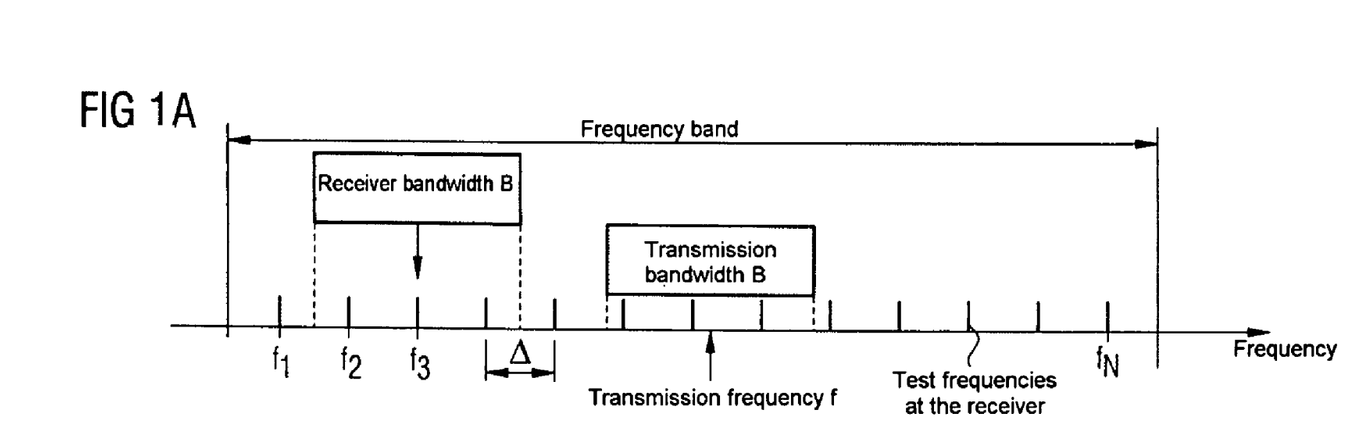
FIG. 1A shows an illustration of the transmission frequency f and of the test frequencies $f_k$ at the receiver.

FIG. 1A shows discrete test frequencies $f_k$ in the receiver for k=1 to N, which are distributed over the entire frequency band of interest for the carrier frequency search. The test frequencies $f_k$ differ by multiples of a step width frequency $\Delta$. The receiver in this case has a specific receiver bandwidth B around the respective test frequency, in which signal components can be received. The illustration shows an instant at which signals are received around the test frequency $f_3$. In addition, the figure shows the transmission spectrum for a model of a rectangular profile with the mid-frequency f and the transmission bandwidth B.

Figure 1B:
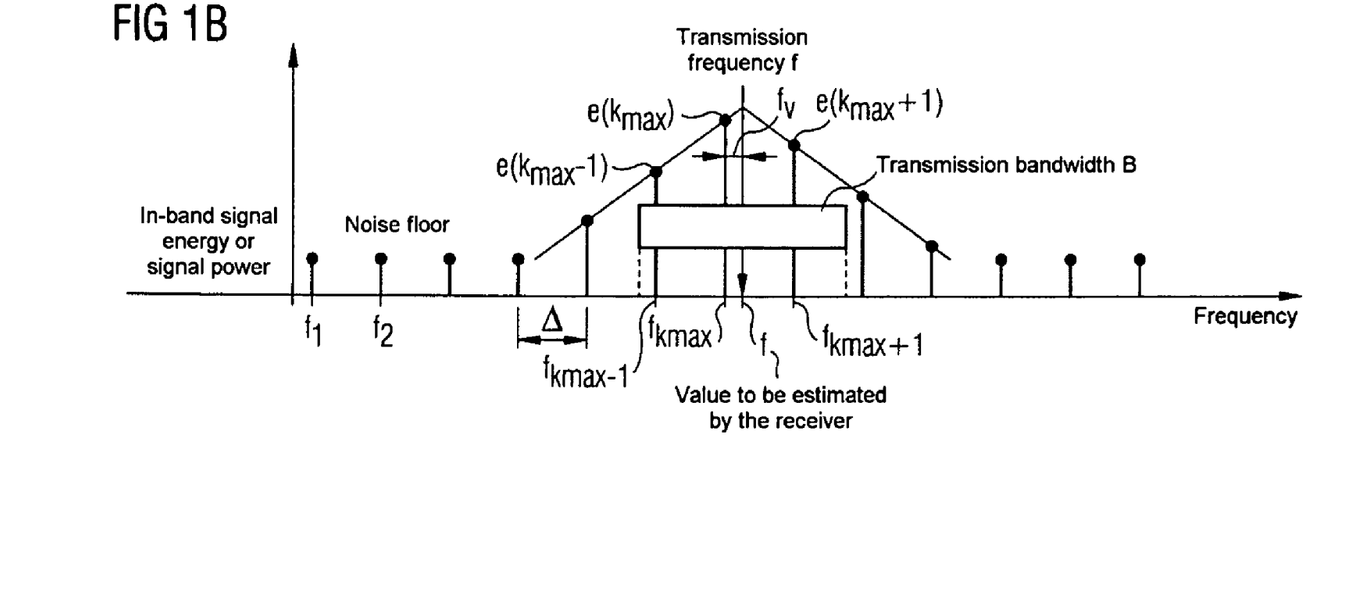
FIG. 1B shows an illustration of the measured spectral power values e(k) for the various test frequencies $f_k$.

In a first step of the method according to the invention, the spectral power values e(k) are determined at the various test frequencies $f_k$. The measurement results of the spectral power values e(k) which are associated with the various test frequencies $f_k$, are illustrated in FIG. 1B. Furthermore, the figure shows the transmission spectrum for a model of a rectangular profile with the mid-frequency f and the transmission bandwidth B. The profile of the measured power values e(k) shows that the power rises when the transmission frequency and reception frequency approach one another, governed by f and $f_k$, respectively. In the case of the model of a rectangular transmission and received spectrum, the power has a triangular profile when plotted against the frequency. If the transmission and reception frequencies were the same, the power value $e(k_{max})$ would have a maximum value at the frequency $f_{kmax}=f$. The two measured values $e(k_{max}+1)$ and $e(k_{max}-1)$ at discrete frequencies $f_{kmax+1}$ and $f_{kmax-1}$ directly above and directly below $f_{kmax}$ would in this case be the same. If there is a small amount of frequency mistuning $f_v$ between the transmitter and receiver, the actual transmission frequency f can be deduced from the discrepancy between $e(k_{max}+1)$ and $e(k_{max}-1)$. An error function S can be defined as a measure of the discrepancy and is determined, for example, as follows:

$$S = \frac{e(k_{max}+1)}{e(k_{max}-1)} - \frac{e(k_{max}-1)}{e(k_{max}+1)}. \tag{3}$$

In this case, S is additionally a function of the frequency mistuning $f_v$. In the method according to the invention, a second step is carried out to determine that power value $e(k_{max})$ from the measured power values e(k) which has the maximum value. The frequency $f_{kmax}$ and thus also, via $f_{kmax}+1$ and $f_{kmax}-1$, the two measured values $e(k_{max}+1)$ and $e(k_{max}-1)$ are now well-defined, so that S can be calculated.

Figure 2:
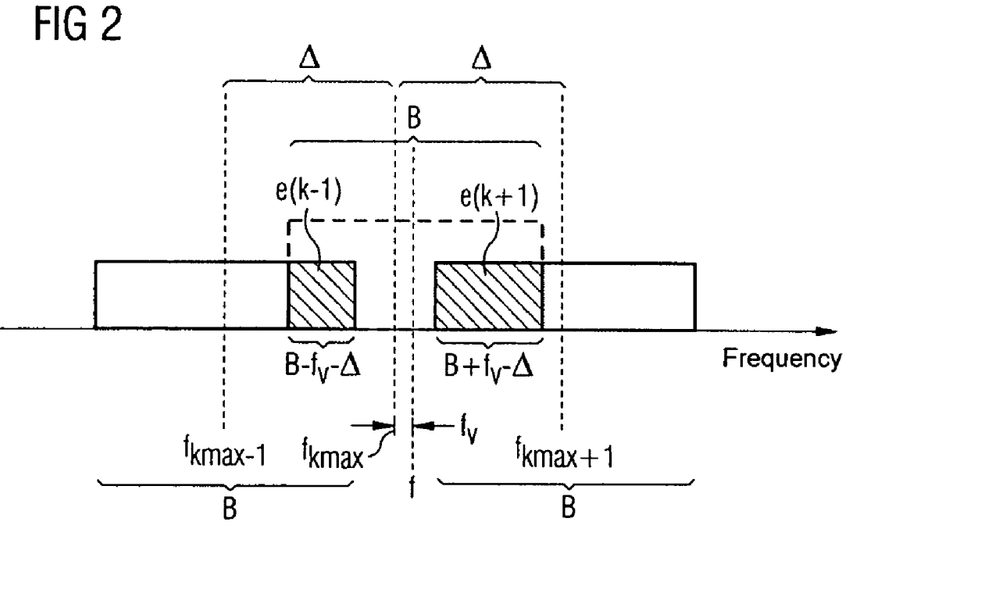
FIG. 2 shows an illustration of the spectral power for a rectangular transmission and reception characteristic and given frequency mistuning $f_v$.

The relationship $S=f(f_v)$ can be derived on the basis of FIG. 2. The figure schematically illustrates the filter characteristics of the transmission and reception filters plotted against the frequency on the assumption of a rectangular bandpass characteristic of the transmission and received spectra. The filter characteristic of the receiver is illustrated by the solid rectangular profiles for a bandwidth B around the two test frequencies $f_{kmax-1}$ and $f_{kmax+1}$ below and above, respectively, a predetermined test frequency $f_{kmax}$, which corresponds to the power maximum. In this case, $f_{max-1}$ and $f_{kmax+1}$ are each shifted by the step width frequency $\Delta$ with respect to $f_{kmax}$. The filter characteristic of the transmitter is indicated by the dashed-line rectangular profile about the mid-frequency or carrier frequency f with the bandwidth B. The test frequency $f_{kmax}$ is shifted by the frequency mistuning $f_v$ in comparison to the carrier frequency f, where $f_v=f-f_{kmax}$. The two power values $e(k_{max}-1)$ and $e(k_{max}+1)$ relating to the two test frequencies $f_{kmax-1}$ and $f_{kmax+1}$, respectively, are proportional to the shaded areas, which indicate the overlapping area between the transmission spectrum and the received spectrum. The shaded areas behave in proportion to their widths, which can be determined for $e(k_{max}-1)$ and $e(k_{max}+1)$ to $B-f_v-\Delta$ and $B+f_v-\Delta$, respectively. In this the error function is:

$$S = \frac{B+f_v-\Delta}{B-f_v-\Delta} - \frac{B-f_v-\Delta}{B+f_v-\Delta}, \tag{4}$$

assuming that $|f_v|\pm min(B-\Delta,\Delta)$.

Figure 3:
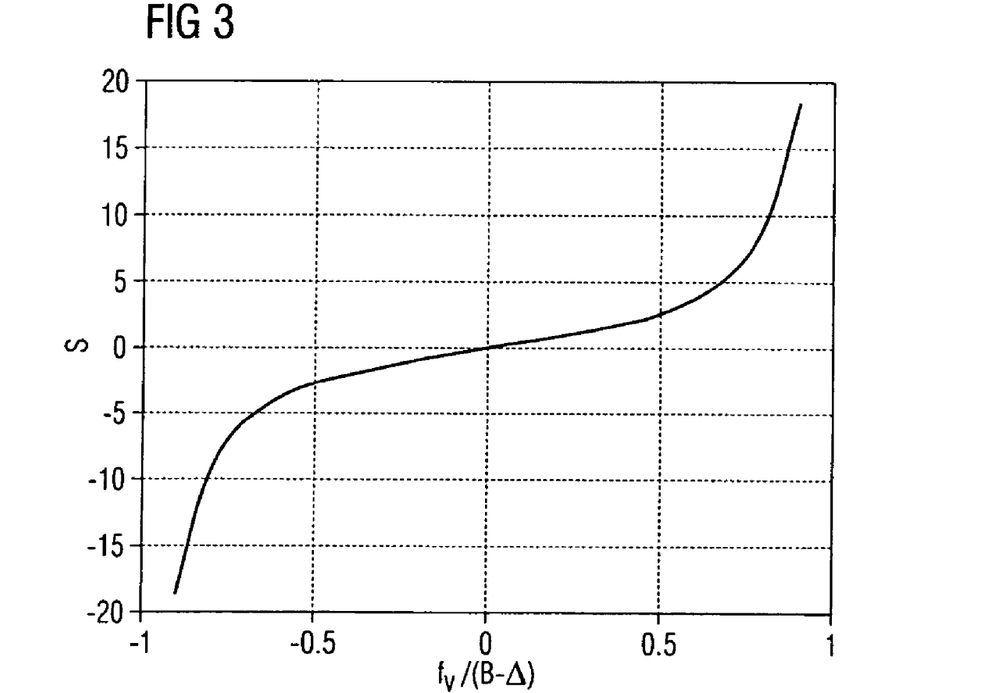
FIG. 3 shows an illustration of the non-linear relationship between the error variable S and the frequency mistuning $f_v$.

FIG. 3 shows the non-linear relationship between the error variable S and the frequency mistuning $f_v$ in the form of a graph. Each value S which is calculated via the measurement of $e(k_{max}-1)$ and $e(k_{max}+1)$ is uniquely associated with one value for the frequency mistuning $f_v$ between f and $f_{kmax}$. The frequency mistuning $f_v$ can thus be determined unambiguously by means of the reciprocal function $S^{-1}(f_v)$.

The method procedure is as follows:
1. measurement of the power values e(k);
2. search for the maximum value $e(k_{max})$;
3. calculation of S using equation (3); and
4. determination of $f_v$ from the reciprocal function $S^{-1}(f_v)$.

The reciprocal function for the function S based on equation (4) is as follows:

$$f_v = \frac{B-\Delta}{S}(\sqrt{4+S^2}-2). \tag{5}$$

The estimated value for the transmission frequency is then given by:

$$f'=f_v+f_{kmax} \tag{6}.$$

On the basis of the model assumptions made so far for determination of $e(k_{max}-1)$ and $e(k_{max}+1)$, the broadband received noise, which is governed mainly by the thermal noise and by the residual noise of the receiver, is not taken into account. This noise leads to a basic level of the measured values e(k) as illustrated in FIG. 1B. If the frequency of a very weak carrier signal is intended to be measured, then the essentially constant noise contribution can be subtracted in order to correct the function S in equation (3) of $e(k_{max}-1)$ and $e(k_{max}+1)$.

Figure 4:
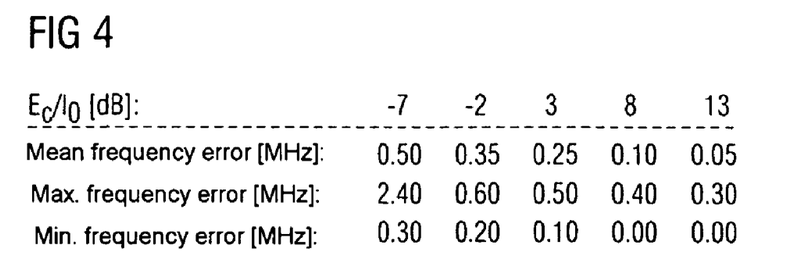
FIG. 4 shows a table of simulation results for the frequency estimation process based on the method according to the invention.

FIG. 4 shows the simulation results for the carrier frequency search based on the method according to the invention. In this case, the following parameters are assumed for a UMTS (Universal Mobile Telecommunications System) receiver: a bandwidth of B=3.84 MHz and a step width frequency of $\Delta=2$ MHz. The mean frequency error, the maximum frequency error and the minimum frequency error are shown for various values of $E_c/I_0$. In this case, $E_c/I_0$ indicates the ratio between the carrier signal power and an assumed interference signal power, which is also referred to as the carrier-to-interference ratio. The respective frequency error should be regarded as the difference between the magnitudes of the estimated value f' of the carrier frequency and the actual carrier frequency f, with the probability of the occurrence of a specific frequency error value tending to zero at the corresponding frequency of the maximum or minimum frequency error. As can be seen from FIG. 4, the simulated frequency errors decrease as the ratio $E_c/I_0$ increases.

Figure 5:
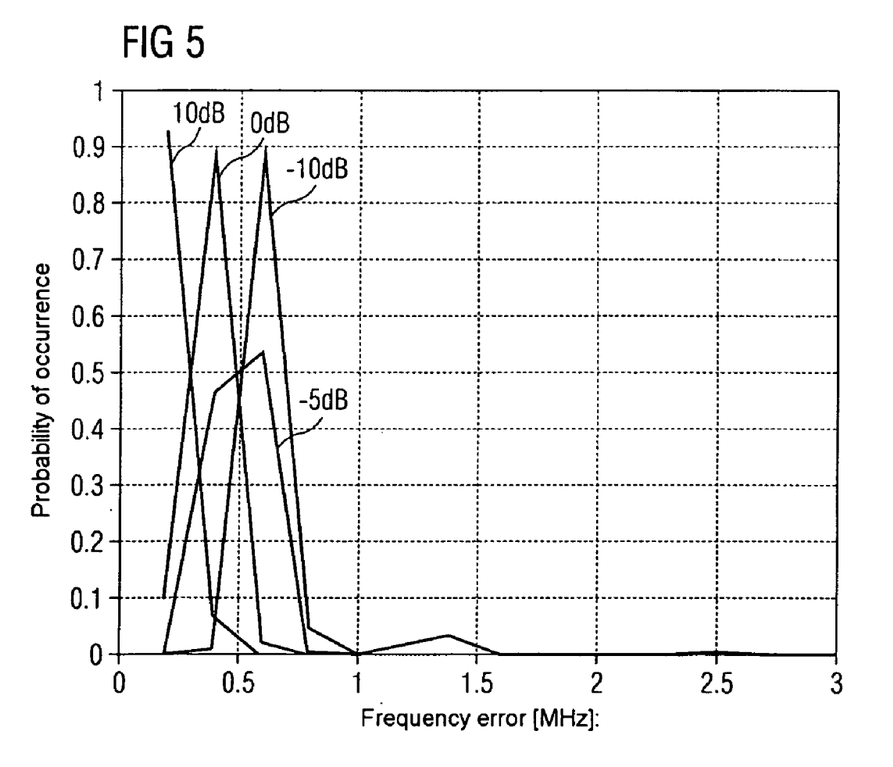
FIG. 5 shows an illustration of the probability of the error value of the frequency estimation process based on the method according to the invention.

FIG. 5 shows the probability of the occurrence of a specific frequency error value during the frequency search based on the method according to the invention, for various values of $E_c/I_0$. As can be seen, by way of example, the maximum probability of the frequency error for a carrier-to-interference ratio $E_c/I_0$ of 0 dB occurs at approximately 400 kHz, which is considerably lower than the step width frequency of 2 MHz. Despite a relatively coarse frequency step width, a small frequency error can be achieved with the aid of the method according to the invention.

Figure 6:
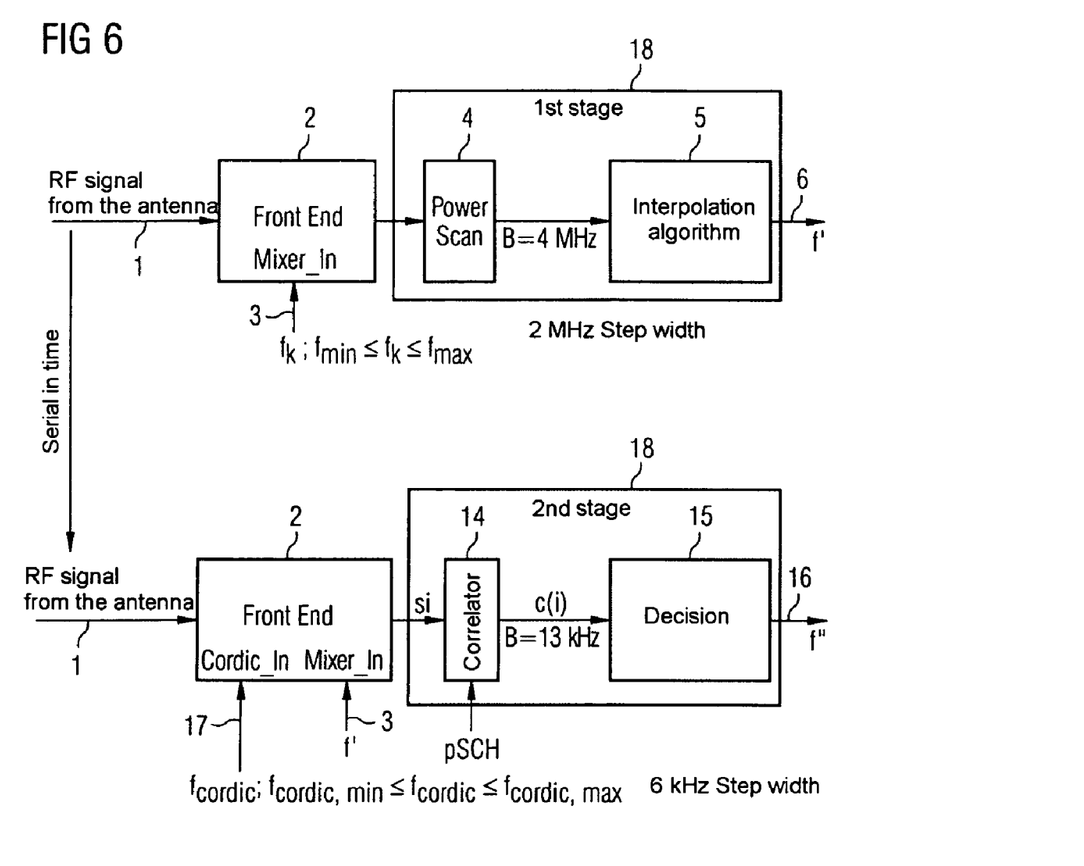
FIG. 6 shows an illustration of the circuitry for implementation of the invention.

FIG. 6 shows the circuitry to implement the invention, with an additional second stage being integrated, for frequency fine tuning. The upper, first part of the illustration shows the broadband radio-frequency antenna signal 1 supplied to a radio-frequency circuit block 2 (front end). This block is driven via an additional control signal 3. The output from the radio-frequency circuit block 2 drives a power measurement unit 4 (power scan). The output signal from the block 4 is processed further in a computation means 5 (interpolation algorithm), thus resulting in an output signal 6. The block 4 and the computation means 5 are part of a baseband chip 18.

Functionally, the radio-frequency antenna signal 1 is first of all converted in the radio-frequency block 2 by means of a mixer to a low-pass-limited low-frequency signal. Within the radio-frequency block 2, the envelope of the spectrum of the antenna signal is shifted by a fixed frequency value in the direction of low frequencies. In this case, the frequency of the signal 3 indicates the value of the frequency translation of the envelope of the received spectrum. The signal 3 is a periodic signal at the discrete frequency $f_k$. However, it would also be possible for the signal 3 itself to directly represent the frequency value $f_k$, from which a corresponding periodic signal at the frequency $f_k$ is then generated. The discrete frequency $f_k$ is varied in the range between $f_{min}$ and $f_{max}$ with a step width frequency $\Delta$ of 2 MHz. The power e(k) of the antenna signal shifted by the frequency $f_k$ is measured by means of an RSSI measurement in the power measurement device 3. In this case, the power measurement device 4 has a measurement range which has a rectangular low-pass characteristic with a bandwidth of B=4 MHz. The maximum value and the associated frequency $f_{kmax}$ are additionally determined—preferably in the power measurement unit 4—from the various power values e(k) which are associated with a respective test frequency $f_k$. The variables $e(k_{max}-1)$ and $e(k_{max}+1)$ according to the invention can be derived from this either in the power measurement unit 4 or in the downstream computation means 5. In this case, the interface (which is, for example, a parallel interface) between the blocks 4 and 5 must, of course, be matched to the functional circuit partitioning. An estimated value f' for the carrier frequency is then determined via the determination of the error variable S in the computation means 5. The output signal 6 from the computation unit 5 may in this case either include a periodic signal at the frequency f' or the frequency value directly. In general, any desired representations of a frequency value are feasible as such, for example a channel number. The test frequencies $f_k$ are controlled via the baseband chip (not shown).

In the lower, second part of FIG. 6, the broadband radio-frequency antenna signal 1 is supplied to the radio-frequency circuit block 2 (front end). This block is driven via the control signal 3 and additionally via the control signal 17. The output from the radio-frequency circuit block 2 drives a correlator 14. The output signal from the block 14 is processed further in an evaluation circuit 15(decision), thus resulting in an output signal 16. The correlator 14 and the evaluation circuit 15 are part of a baseband chip 18.

In the circuit arrangement in the lower part of the illustration, signals and circuit parts are used which are functionally involved in the above determination of f'. This relates to the same receiver, with the functional interaction illustrated in the lower part of FIG. 6 occurring at a time after the functional interaction illustrated in the upper part.

The envelope of the spectrum of the radio-frequency antenna signal 1 is shifted, in accordance with the above description, in the circuit block 2 by the previously determined estimate f' of the carrier frequency via the control signal 3. Furthermore, for frequency fine tuning, the envelope is additionally shifted by a frequency $f_{cordic}$, which is governed by the signal 17, with $f_{cordic}$ being varied in discrete steps with a very fine step width of $\Delta'$=6 kHz over a range $f_{cordic,min}$ to $f_{cordic,max}$. In this case, $f_{cordic}$ may also assume negative values. The frequency translation via $f_{cordic}$ is preferably based on analogue/digital conversion (not shown) with the aid of the digital CORDIC algorithm, and in this case, and in contrast to the illustration is in general not part of the radio-frequency circuit block 2 for frequency translation. The general principles of the CORDIC algorithm are described, for example, in "The CORDIC Trigometric Computing Technique", J. E. Volder, IRE Trans. Electronic Computers, vol. 8, pages 330–334, 1959 or "A Unified Algorithm for Elementary Functions", J. S. Walther, Spring Joint Conference, pages 370–385, 1971. In a slightly modified form, an analogue frequency translation via an analogue mixer would also be feasible, although this would then produce only positive values of $f_{cordic}$, and f' would have to be shifted appropriately. The individual signals $s_i$, which are frequency-shifted differently via $f_{cordic}$, are supplied to the correlator 14, which in each case determines the values of a variable c(i). This variable is characteristic of the correlation between the synchronization sequence which is contained in the respective signal $s_i$ and the synchronization sequence which is known in the receiver. The synchronization sequence in the present exemplary embodiment is the synchronization sequence of a specific UMTS-specific synchronization channel, which in the case of UMTS is also referred to as the pSCH (primary synchronization channel), and is used in the course of the carrier frequency search. The use of synchronization sequences for synchronization purposes is familiar for CDMA (Code Division Multiple Access)—based systems such as UMTS. On the basis of the values c(i) from the correlation which is supplied to the circuit block 15, the maximum of the values c(i) can be determined in the circuit block 15, with this maximum being associated with a specific frequency $f_{cmax}$ of the frequencies $f_{cordic}$. The output from the circuit block 15 produces, as the output signal 16, either $f_{cmax}$, with the sought carrier frequency f" being obtained from the sum of $f_{cmax}$ and f', or a value for the carrier frequency f", directly. In this case, the signal 16 may either include a periodic signal at the specific frequency, or may include the frequency value directly. In general, any desired representations of a frequency value as such are possible, as mentioned above. Furthermore, it is not absolutely essential to determine an estimated value for the carrier frequency f" in a numerical form or as a periodic signal; it would also be feasible for the carrier frequency search to be completed with the aim of optimum setting of the correlator—without having to detect the actual frequency numerically.

We claim:

1. A method for searching for the carrier frequency f of a mobile radio transmitter in a mobile radio receiver, having the following steps:
    a) measuring two or more values e(k) of a variable which is characteristic of the spectral reception power at various discrete test frequencies $f_k$, with the test frequencies $f_k$ differing by multiples of a step width frequency $\Delta$ and with $f_k$ being less than $f_{k+1}$ for all measured values e(k) and e(k+1);
    b) searching for the maximum $e(k_{max})$ of the values e(k), with $e(k_{max})$ being associated with a specific test frequency $f_{kmax}$; and
    c) determining of an estimated value f', which is characteristic of the sought carrier frequency f, from knowledge of the values of at least one value pair $e(k_1)$ and $e(k_2)$ where $k_1 < k_{max} < k_2$, and of the specific test frequency $f_{kmax}$.

2. The method according to claim 1, wherein the determination of the estimated value f' in step c) includes the following step:

determining an error variable S from knowledge of the values of the at least one value pair $e(k_1)$ and $e(k_2)$, where S represents a measure of the discrepancy between the respective values of the at least one value pair $e(k_1)$ and $e(k_2)$.

3. The method according to claim 2, wherein $k_1=k_{max}-1$ and $k_2=k_{max}+1$.

4. The method according to claim 3, wherein the error variable S is obtained using the following equation:

$$S = \frac{e(k_{\max}+1)}{e(k_{\max}-1)} - \frac{e(k_{\max}-1)}{e(k_{\max}+1)}.$$

5. The method according to claim 2, wherein the method for determination of the estimated value f' of the carrier frequency in step c) uses an analytical equation, which the error variable S links either to the two variables of the estimated value f' of the carrier frequency and the test frequency $f_{kmax}$, or to the frequency mistuning $f_v$, formed as the difference between f' and $f_{kmax}$.

6. The method according to claim 5, wherein the analytical equation includes the following variables:
one or more variables for characterization of the form of the transmission spectrum and/or of the received spectrum, in particular the bandwidth of the transmission and/or received spectrum and/or the bandwidth of the transmission and/or reception filter.

7. The method according to claim 6, wherein the estimated value f' of the carrier frequency in step c) is obtained as follows:

$$f' = f_{k\max} + \frac{B-\Delta}{S}(\sqrt{4+S^2} - 2),$$

where B indicates the bandwidth of the transmission and received spectrum.

8. The method according to claim 1, wherein during the determination of the estimated value f' of the carrier frequency in step c), either the measured values e(k) are corrected directly by the broadband white noise floor of the received spectrum or, correction terms which correspond to the broadband white noise floor are used in the calculation in step c).

9. The method according to claim 1, wherein a radio signal strength indicator (RSSI) measurement is carried out in step a).

10. The method according to claim 1, wherein an additional step d) is carried out after step c) which comprises:
a correlative frequency fine tuning process on the basis of a comparison of a synchronization sequence, which is contained in the received signal, and the synchronization sequence which is known in the receiver, taking into account the estimated value f' of the carrier frequency as determined in step c).

11. The method according to claim 10, wherein step d) is carried out as follows:
producing differently frequency-shifted signals $s_i$ based on the received signal, which are shifted with respect to the received signal by the estimated value f' of the carrier frequency and multiples of a step width frequency $\Delta'$, where $\Delta'<\Delta$;
determining two or more values of a variable c(i) which is characteristic of the correlation between the synchronization sequence which is contained in the respective signal $s_i$ and the synchronization sequence which is known in the receiver; and
determining a new estimated value f'', which is characteristic of the carrier frequency f, by evaluation of the values c(i).

12. A circuit arrangement for searching for the carrier frequency f of a mobile radio transmitter in a mobile radio receiver, comprising
a) a measurement device for measurement of two or more values e(k) of a variable which is characteristic of the spectral transmission power at different discrete test frequencies $f_k$, with the test frequencies differing by multiples of a step width frequency $\Delta$,
b) an evaluation device which determines the maximum $e(k_{max})$ of the values e(k), where $e(k_{max})$ is associated with a specific test frequency $f_{kmax}$, and
c) a computation means which determines the estimated value f' of the carrier frequency f from knowledge of the values of the at least one value pair $e(k_1)$ and $e(k_2)$ and of the test frequency $f_{kmax}$, where $k_1<k_{max}<k_2$.

13. The circuit arrangement according to claim 12, wherein $k_1=k_{max}-1$ and $k_2=k_{max}+1$.

14. The circuit arrangement according to claim 12, wherein the circuit arrangement further comprises:
d) a correlator for comparison of a synchronization sequence which is contained in the received signal and of the synchronization sequence which is known in the receiver,
e) a frequency shifting means for spectral shifting of the received signal, and
f) a second evaluation device, which compares the output variable from the correlator at different frequency shifts for frequency fine tuning.

15. The circuit arrangement according to claim 14, wherein
the frequency shifting means produces differently frequency-shifted signals $s_i$ based on the received signal, which are shifted with respect to the received signal by the estimated value f' of the carrier frequency and multiples of a step width frequency $\Delta'$, where $\Delta'<\Delta$;
the correlator determines two or more values of a variable c(i) which is characteristic of the correlation between the synchronization sequence which is contained in the respective signal $s_i$ and the synchronization sequence which is known in the receiver; and
the second evaluation device determines a new estimated value f'', which is characteristic of the carrier frequency f, by evaluation of the values c(i).

16. The circuit arrangement according to claim 12, wherein the measurement device carries out an radio signal strength indicator (RSSI) measurement.

17. The circuit arrangement according to claim 12, wherein the circuit arrangement is used in a UMTS receiver.

18. A circuit arrangement for searching for the carrier frequency f of a mobile radio transmitter in a mobile radio receiver, comprising
a) a measurement device for measurement of two or more values e(k) of a variable which is characteristic of the spectral transmission power at different discrete test frequencies $f_k$, with the test frequencies differing by multiples of a step width frequency $\Delta$,
b) an evaluator which determines the maximum $e(k_{max})$ of the values e(k), where $e(k_{max})$ is associated with a specific test frequency $f_{kmax}$, and c) a processor which determines the estimated value f' of the carrier frequency f from knowledge of the values of the at least one value pair $e(k_1)$ and $e(k_2)$ and of the test frequency $f_{kmax}$, where $k_1 < k_{max} < k_2$.

19. The circuit arrangement according to claim 18, wherein $k_1 = k_{max} - 1$ and $k_2 = k_{max} + 1$.

20. The circuit arrangement according to claim 18, wherein the circuit arrangement further comprises:

d) a correlator for comparison of a synchronization sequence which is contained in the received signal and of the synchronization sequence which is known in the receiver, e) a frequency shifter for spectral shifting of the received signal, and f) a second evaluator, which compares the output variable from the correlator at different frequency shifts for frequency fine tuning.

* * * * *